United States Patent
Lo et al.

(10) Patent No.: US 9,764,646 B2
(45) Date of Patent: Sep. 19, 2017

(54) LEAK HYDROGEN ABSORBING DEVICE, HYDROGEN ENERGY UTILIZATION SYSTEM AND LEAK HYDROGEN ABSORBING METHOD

(71) Applicant: Industrial Technology Research Institute, Hsinchu (TW)

(72) Inventors: Kai-Fan Lo, Kaohsiung (TW); Chien-Yun Huang, Hsinchu County, TN (US)

(73) Assignee: Industrial Technology Research Institute, Hsinchu (TW)

(*) Notice: Subject to any disclaimer, the term of this patent is extended or adjusted under 35 U.S.C. 154(b) by 36 days.

(21) Appl. No.: 14/932,989

(22) Filed: Nov. 5, 2015

(65) Prior Publication Data
US 2016/0167521 A1    Jun. 16, 2016

Related U.S. Application Data

(60) Provisional application No. 62/095,788, filed on Dec. 23, 2014.

(30) Foreign Application Priority Data

Dec. 15, 2014    (TW) .............................. 103143657 A (51) Int. Cl.
*B01D 53/02* (2006.01)
*B60L 3/00* (2006.01)
(Continued)

(52) U.S. Cl.
CPC ....... *B60L 3/0053* (2013.01); *H01M 8/04089* (2013.01); *H01M 8/04201* (2013.01); *H01M 8/04664* (2013.01)

(58) Field of Classification Search
CPC ............. B60L 3/0053; H01M 8/04089; H01M 8/04201; H01M 8/04664
See application file for complete search history.

(56) References Cited

U.S. PATENT DOCUMENTS 3,336,730 A * 8/1967 Hovey ................... B01D 53/22
159/DIG. 27
4,667,815 A * 5/1987 Halene .................. C01B 3/0005
206/0.6

(Continued)

FOREIGN PATENT DOCUMENTS

| CN | 1235255  | 11/1999 |
|----|----------|---------|
| CN | 101121116 | 2/2008 |

(Continued)

OTHER PUBLICATIONS

Nishibori et al., "Robust hydrogen detection system with a thermoelectric hydrogen sensor for hydrogen station application," International Journal of Hydrogen Energy, Mar. 2009, pp. 2834-2841.

(Continued)

*Primary Examiner* — Christopher P Jones
(74) *Attorney, Agent, or Firm* — Jianq Chyun IP Office (57) ABSTRACT

A leak hydrogen absorbing device is provided and includes an absorbing tank, having a gas inlet and a gas outlet; a spacer, disposed inside the absorbing tank, and partitioning an interior of the absorbing tank into multiple spaces; a hydrogen absorbing material, disposed in the spaces; a connecting tube, disposed on the spacer, and connecting the spaces; a pump, pumping a hydrogen-containing gas leaked in a closed environment to the absorbing tank through the gas inlet to be flowed through the spaces inside the absorbing tank, so that the hydrogen gas contained in the hydrogen-containing gas is absorbed by the hydrogen absorbing material; and a depressurizing portion, disposed at a terminal end of the absorbing tank, and storing a hydrogen-free gas (Continued)

US 9,764,646 B2
Page 2 passed through the hydrogen absorbing material. The hydrogen-free gas is discharged through the gas outlet when reaching a predetermined pressure.

20 Claims, 5 Drawing Sheets (51) Int. Cl.
H01M 8/04082 (2016.01)
H01M 8/04089 (2016.01)
H01M 8/04664 (2016.01)

(56) References Cited

U.S. PATENT DOCUMENTS

| | | | |
|---|---|---|---|
| 4,859,116 A | 8/1989 | Harris | |
| 5,697,221 A * | 12/1997 | Sapru | F17C 1/00 62/45.1 |
| 5,953,922 A * | 9/1999 | Stetson | C01B 3/0005 165/104.12 |
| 6,182,717 B1 * | 2/2001 | Yamashita | B60K 15/03006 141/18 |
| 7,287,558 B2 | 10/2007 | Hobbs | |
| 7,368,192 B2 | 5/2008 | Pettit et al. | |
| 7,947,119 B2 * | 5/2011 | Gozl | C01B 3/0005 206/0.7 |
| 8,646,597 B2 * | 2/2014 | Yang | F17C 11/005 206/0.7 |
| 8,778,057 B2 | 7/2014 | Hashida | |
| 2002/0006365 A1 * | 1/2002 | Suzuki | B01D 53/0407 422/177 |
| 2002/0134370 A1 * | 9/2002 | Suzuki | C01B 3/0005 126/263.01 |
| 2003/0019765 A1 * | 1/2003 | Yang | C01B 3/0005 206/0.7 |
| 2003/0215688 A1 * | 11/2003 | Yang | F17C 13/04 429/513 |
| 2008/0290645 A1 * | 11/2008 | Handa | F17C 1/00 280/834 |
| 2009/0297896 A1 * | 12/2009 | Kimbara | F17C 11/005 429/437 |
| 2010/0024542 A1 * | 2/2010 | Yen | F17C 11/005 73/290 R |
| 2011/0150756 A1 * | 6/2011 | Adams | B01D 53/047 423/657 |
| 2012/0061397 A1 * | 3/2012 | Fruchart | C01B 3/0005 220/560.04 |
| 2012/0160712 A1 * | 6/2012 | Yang | F17C 11/005 206/0.7 |
| 2012/0222972 A1 * | 9/2012 | Chaise | C01B 3/0005 206/0.7 |
| 2013/0220479 A1 | 8/2013 | Luo et al. | |

FOREIGN PATENT DOCUMENTS

| | | |
|---|---|---|
| CN | 101209390 | 7/2008 |
| CN | 202155133 | 3/2012 |
| CN | 102208216 | 6/2013 |
| TW | 509769 | 11/2002 |
| TW | 200916683 | 4/2009 |
| TW | I330703 | 9/2010 |
| TW | I349081 | 9/2011 |

OTHER PUBLICATIONS

Sakintuna et al., "Metal hydride materials for solid hydrogen storage: A review," International Journal of Hydrogen Energy, Jun. 2007, pp. 1121-1140.

Shigeki Kikukawa, "Consequence analysis and safety verification of hydrogen fueling stations using CFD simulation," International Journal of Hydrogen Energy, Feb. 2008, pp. 1425-1434.

Swain et al., "Passive ventilation systems for the safe use of hydrogen," International Journal of Hydrogen Energy, Oct. 1996, pp. 823-835.

Kazuo Matsuura, "Effects of the geometrical configuration of a ventilation system on leaking hydrogen dispersion and accumulation," International Journal of Hydrogen Energy, Dec. 2009, pp. 9869-9878.

"Office Action of Taiwan Counterpart Application", dated Aug. 13, 2015, p. 1-p. 5.

* cited by examiner

LEAK HYDROGEN ABSORBING DEVICE, HYDROGEN ENERGY UTILIZATION SYSTEM AND LEAK HYDROGEN ABSORBING METHOD

CROSS-REFERENCE TO RELATED APPLICATION

This application claims the priority benefit of Taiwan application no. 103143657, filed on Dec. 15, 2014 and the priority benefit of U.S. provisional application Ser. No. 62/095,788, filed on Dec. 23, 2014. The entirety of each of the above-mentioned patent applications is hereby incorporated by reference herein and made a part of this specification.

TECHNICAL FIELD

The technical field relates to a leak hydrogen absorbing device, a hydrogen energy utilization system and a leak hydrogen absorbing method.

BACKGROUND

Utilizations of the hydrogen energy have become increasingly widespread around the world. Hydrogen fuel cell is one of the most important methods for using the hydrogen energy. Because of the risk of hydrogen explosion, safety issue of hydrogen becomes the major factor for deciding whether the hydrogen energy can be effectively utilized.

Currently, a solid state hydrogen storage method (which stores hydrogen by using a hydrogen storage metal) is a relatively safe technique that can effectively and safely absorb the hydrogen gas and prevent the risk of hydrogen leakage. However, because the hydrogen storage metal is relatively high in cost, the overall cost will be significantly increased if the entire hydrogen storage system is made of the hydrogen storage metal.

Further, the conventional technology generally includes two methods for discharging the leaked hydrogen gas, which are provided as follows. The first method is to provide an open environment and dissipate the leaked hydrogen gas to the open environment by utilizing an exhaust blower. Yet, the first method cannot be used if the open environment cannot be provided. Furthermore, the leaked hydrogen gas is prone to friction with the exhaust blower to thereby cause fire explosion. Also, if the leaked gas is farther away from the exhaust blower, an issue where the leaked hydrogen gas is discharged slowly may arise.

The second method is to burn the leaked hydrogen gas with assistance of the oxygen gas, so as to transform the leaked hydrogen gas into water. Nonetheless, this method is inconvenient since burning the hydrogen gas requires additional supply of the oxygen gas or air. Furthermore, the combustion reaction will generate high temperature, which can also lead to risks. Worse yet, the requirement of cooling equipment will increase the overall cost instead.

In addition, with popularization of the hydrogen energy technology, the chance of using the hydrogen energy in the closed environment is also increasingly higher. Therefore, it has become one of the research trends for the hydrogen energy technology as to how to safely utilize the hydrogen energy in the closed environment.

SUMMARY

The present disclosure provides a leak hydrogen absorbing device, a hydrogen energy utilization system and a leak hydrogen absorbing method, which are suitable for a closed environment, and capable of safely and rapidly absorbing the leaked hydrogen gas to prevent the risks caused by the leaked hydrogen gas accumulated in the closed environment. In addition, the leaked hydrogen gas can be absorbed for a secondary use, which helps to improve efficiency of energy utilization.

According to an embodiment of the present disclosure, a leak hydrogen absorbing device is used in a closed environment. The leak hydrogen absorbing device includes an absorbing tank, a spacer, a hydrogen absorbing material, a communicating tube, a pump and a depressurizing portion. The absorbing tank has a gas inlet and a gas outlet. The spacer is disposed inside the absorbing tank, and partitions an interior of the absorbing tank into multiple spaces. The hydrogen absorbing material is disposed in the spaces. The connecting tube is disposed on the spacer, and connects the spaces. The pump pumps a hydrogen-containing gas leaked in the closed environment to the absorbing tank through the gas inlet to be flowed through the spaces inside the absorbing tank. The hydrogen gas contained in the hydrogen-containing gas is absorbed by the hydrogen absorbing material. The depressurizing portion is disposed at a terminal end of the absorbing tank. The depressurizing portion stores a hydrogen-free gas passed through the hydrogen absorbing material, and the hydrogen-free gas is discharged through the gas outlet when the hydrogen-free gas reaches a predetermined pressure.

A hydrogen energy utilization system of the present disclosure is used in a closed environment. The hydrogen energy utilization system includes a hydrogen gas storage device, a hydrogen gas utilization device and aforesaid leak hydrogen absorbing device. The hydrogen gas utilization device connects to the hydrogen gas storage device through a hydrogen gas transportation pipeline. Aforesaid leak hydrogen absorbing device is connected to a position where the hydrogen-containing gas is leaked in the closed environment.

A leak hydrogen absorbing method of the present disclosure includes the following steps. First of all, aforesaid leak hydrogen absorbing device is provided. Subsequently, when detecting that the leaked hydrogen-containing gas is present in the closed environment, the pump is activated to start pumping the hydrogen-containing gas to the absorbing tank. Next, the hydrogen-containing gas is passed to flow through the spaces inside the absorbing tank, so that the hydrogen gas contained in the hydrogen-containing gas is absorbed by the hydrogen absorbing material. Thereafter, the hydrogen-free gas passed through the hydrogen absorbing material is stored, and the hydrogen-free gas is discharged through the gas outlet when the hydrogen-free gas reaches a predetermined pressure.

Based on the above, the present disclosure provides the leak hydrogen absorbing device, the hydrogen energy utilization system and the leak hydrogen absorbing method, which are suitable for the closed environment, and capable of safely and rapidly absorbing the leaked hydrogen gas. In addition, the leaked hydrogen gas can be absorbed and stored for the secondary use. Moreover, the hydrogen absorbing material may be reduced for reuse, which helps in cost saving.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
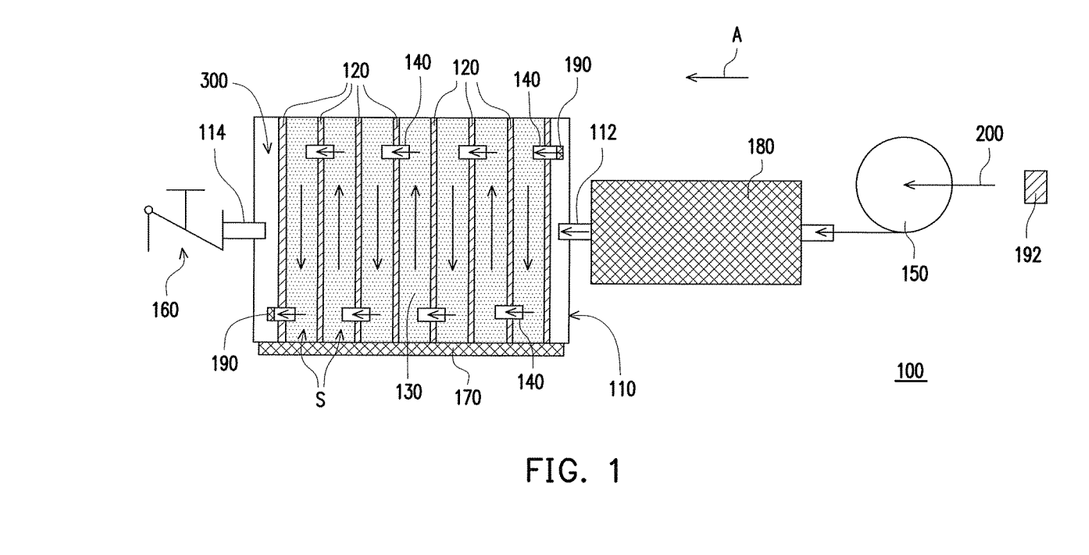
FIG. 1 is a schematic diagram of a leak hydrogen absorbing device according to an embodiment of the present disclosure.

FIG. 1 is a schematic diagram of a leak hydrogen absorbing device according to an embodiment of the present disclosure. Referring to FIG. 1, a leak hydrogen absorbing device 100 is adapted to a closed environment. The closed environment may be an internal space of an apartment, a building, a motor car, a steamship, an excursion boat or an air independent propulsion (AIP) of a submarine. A temperature of the closed environment may be 10° C. to 60° C. In other words, the leak hydrogen absorbing device 100 can operate in normal temperature.

Referring to FIG. 1, the leak hydrogen absorbing device 100 includes an absorbing tank 110, a spacer 120, a hydrogen absorbing material 130, a communicating tube 140, a pump 150 and a depressurizing portion 160. The absorbing tank 110 has a gas inlet 112 and a gas outlet 114. The spacer 120 is disposed inside the absorbing tank 110 for partitioning the interior of the absorbing tank 110 into multiple spaces S. The hydrogen absorbing material 130 is disposed in the spaces S. The connecting tube 140 is disposed on the spacer 120, and the communicating tube 140 connects the spaces S.

The pump 150 pumps a hydrogen-containing gas 200 leaked in the closed environment to the absorbing tank 110 through the gas inlet 112 to be flowed through the spaces S inside the absorbing tank 110. The hydrogen gas contained in the hydrogen-containing gas 200 is absorbed by the hydrogen absorbing material 130. The depressurizing portion 160 is disposed at a terminal end of the absorbing tank 110. The depressurizing portion 160 stores a hydrogen-free gas 300 passed through the hydrogen absorbing material 130, and the hydrogen-free gas 300 is discharged through the gas outlet 114 when the hydrogen-free gas 300 reaches a predetermined pressure.

Safety in use of the hydrogen energy in the closed environment may be improved by placing the leak hydrogen absorbing device 100 of the forgoing embodiment and a hydrogen energy device (e.g., a hydrogen fuel cell, etc.) together. Embodiment regarding each element in the leak hydrogen absorbing device 100 will be described as follows.

Referring to FIG. 1, the absorbing tank 110 may be manufactured by using a metal, a stainless steel or other suitable materials, which are capable of bearing the gas pressure and hard to generate chemical reaction with the hydrogen gas. According to the embodiment of the present disclosure, the absorbing tank 110 including the gas inlet 112 and the gas outlet 114 is different from the design of common hydrogen storage tank which only has one gas inlet. With configuration of the gas inlet 112 and the gas outlet 114, a gas circulation path may be easily formed in the absorbing tank 110, which helps transportation and exhaustion of the gas. This helps a releasing process of the hydrogen gas by heating the hydrogen absorbing material 130 (for the secondary use of the hydrogen gas) as well as an exhaustion process of the hydrogen-free gas 300 by using the depressurizing portion 160 in the subsequent description.

As shown in the embodiment of FIG. 1, the spacer 120 may be plural, and the spacers 120 are disposed inside the absorbing tank 110 in an arrangement with interval from each other. Said arrangement with interval from each other of the spacers 120 may adopt a parallel arrangement as depicted in FIG. 1, such that the spacers 120 can be spaced apart by a set distance and in parallel to each other. Specifically, in the embodiment of FIG. 1, the spacers 120 may be arranged in parallel to each other along a length direction (a horizontal direction of the paper surface in FIG. 1) of the absorbing tank 110. The length direction of the absorbing tank 110 may also be considered as a horizontal extending direction along a virtual line (not illustrated) connecting the gas inlet 112 and the gas outlet 114. An extending direction of each of the spacers 120 is perpendicular to the length direction the absorbing tank 110, and an end portion of each of the spacers 120 is connected to an inner wall of the absorbing tank 110.

As shown in FIG. 1, the spacers 120 are disposed in the parallel arrangement with equal interval. In addition, the spacers 120 may also be spaced apart from each other and arranged based on the desired design approach. For example, the spacers 120 may be disposed in parallel to each other but with non-equal intervals (not illustrated), or the spacers 120 may be disposed in parallel to each other with gradually changing intervals (not illustrated). It is also possible that the spacers 120 are not parallel to each other. Variations or modifications to the arrangement of the spacers 120 all fall within the scope of "the arrangement with interval from each other" as claimed by the present application, as long as the absorbing tank 110 may be partitioned into multiple spaces S and the gas circulation path with proper length may be provided. The parallel arrangement as shown in FIG. 1 is merely an example, and the arrangement with interval from each other for the spacers 120 according to the present disclosure is not limited thereto.

With configuration of the spacers 120, the spaces S for placing the hydrogen absorbing material 130 may be formed inside the absorbing tank 110, and the gas circulation path for circulating the leaked gas may be formed. As shown by an arrow A of a gas circulation direction in FIG. 1, with push of the pump 150, the hydrogen-containing gas 200 can flow through the spaces S. As a result, the hydrogen gas contained in the hydrogen-containing gas 200 may be absorbed and stored by the hydrogen absorbing material 130.

Further, the spacers 120 depicted in FIG. 1 are arranged in parallel to a diameter direction of the absorbing tank 110 (a vertical direction of the paper surface in FIG. 1); although not illustrated, the spacers 120 may also be arranged in parallel to the length direction of the absorbing tank 110 (the vertical direction of the paper surface in FIG. 1).

In addition, the communicating tube 140 depicted in FIG. 1 may be plural. In the present embodiment, a predetermined distance is provided between positions of the communicating tubes 140 respectively disposed on adjacent two of the spacers 120. For example, as shown in FIG. 1, the two adjacent communicating tubes 140 near the gas inlet 112 are located at diagonal positions. Accordingly, the positions of the connecting tubes 140 may be determined by setting the predetermined distance, so that the hydrogen-containing gas 200 can flow through the gas circulation path with proper length in the spaces S to improve a response time and a contact area of the hydrogen absorbing material 130 and the hydrogen-containing gas 200. As a result, the hydrogen gas contained in the hydrogen-containing gas 200 may be fully absorbed by the hydrogen absorbing material 130.

As shown in FIG. 1, the depressurizing portion 160 may adopt a decompression valve. A space is provided at the terminal end of the absorbing tank 110, and the space can store the hydrogen-free gas 300 passed through the hydrogen absorbing material 130. When the hydrogen-free gas 300 reaches or exceeds the predetermined pressure (e.g., exceeds 10 bar), the depressurizing portion 160 is opened to discharge the hydrogen-free gas 300 through the gas outlet 114. A gas pressure detector (not illustrated) may be disposed on the decompression valve to detect whether the hydrogen-free gas 300 exceeds the predetermined pressure and feed back a driving signal (open/close) to the depressurizing portion 160 (the decompression valve) in order to open or close the depressurizing portion 160.

Referring to FIG. 1, in an embodiment, the leak hydrogen absorbing device 100 may further include at least one heater 170, which is disposed on one side of the absorbing tank 110. The heater 170 may also be plural and in thermal connection with a surface of the absorbing tank 110. Eventually, an absorbing capability of the hydrogen absorbing material 130 for the hydrogen gas will reach saturation. When the absorbing capability of the hydrogen absorbing material 130 reaches saturation, the heater 170 may be used for heating the hydrogen absorbing material 130 in order to release the absorbed hydrogen gas from the hydrogen absorbing material 130. As such, the hydrogen absorbing material 130 may be reduced to regain the absorbing capability for the hydrogen gas, so that the hydrogen absorbing material 130 may be repeatedly utilized. Further, the secondary use of the released hydrogen gas may also be conducted to improve a use efficiency of the hydrogen energy.

Referring back to FIG. 1, in an embodiment, the leak hydrogen absorbing device 100 may further include a filter 180, which is disposed in front of the gas inlet 112 of the absorbing tank 110. The filter 180 can filter out harmful substances contained in the hydrogen-containing gas 200 to prevent the harmful substances from entering the absorbing tank 110 and causing degradation to the hydrogen absorbing material 130.

Further, the leak hydrogen absorbing device 100 may also include a filter screen 190, which is disposed on at least one end of the communicating tube 140. As shown in FIG. 1, the communicating tube 140 at the rightmost of FIG. 1 and the communicating tube 140 at the leftmost of FIG. 1 are disposed with the filter screen 190. However, the present disclosure is not limited thereto. That is, the filter screen 190 may be disposed on at least one end or both ends of each of the communicating tubes 140. The function of the filter screen 190 is to prevent the hydrogen absorbing material 130 from dissipating within each of the spaces S along with flowing of the hydrogen-containing gas 200 (e.g., in direction of the arrow A depicted in FIG. 1). This helps the hydrogen absorbing material 130 to stably exist in respective one of the originally-set spaces S.

In an embodiment, the leak hydrogen absorbing device 100 further includes a hydrogen gas detector 192, which is configured to detect the hydrogen-containing gas 200 leaked in the closed environment. The hydrogen gas detector 192 may be disposed near a position where the hydrogen-containing gas 200 is leaked in the closed environment. With configuration of the hydrogen gas detector 192 at the position where a hydrogen gas leakage may occur, when detecting that the hydrogen gas leakage occurs, the hydrogen gas detector 192 may feed back an activate signal to activate the pump 150, so as to start the operation of the leak hydrogen absorbing device 100; and when detecting that a hydrogen concentration in the closed environment is already returned back to a normal range, the hydrogen gas detector 192 may feed back a deactivate signal to deactivate the pump 150, so as to stop the operation of the leak hydrogen absorbing device 100.

In an embodiment, the hydrogen absorbing material 130 may be in form of powder, grain or ingot. The form of the hydrogen absorbing material 130 may be selected according to desired parameters such as a reaction rate (or the contact area) between the hydrogen absorbing material 130 and the hydrogen gas, and a storage stability of the hydrogen absorbing material 130.

For example, when the hydrogen absorbing material 130 is in form of powder, the contact area with the hydrogen gas becomes greater, so that an adsorption rate of the hydrogen gas may be accelerated to reduce the time required by the leak hydrogen absorbing device 100 for absorbing the hydrogen gas. Further, when the hydrogen absorbing material 130 is in form of grain or ingot, the storage stability of the hydrogen absorbing material 130 may be improved.

Furthermore, the hydrogen absorbing material 130 is selected from a combination of a first material and a second material. The first material is selected from Ti, La, Mg, Sr, Li, Cr, Ir, Ca and Pd. The second material is selected from Ag, Ni, Au, Pt, Cu, Co, Al, Fe, V, Mn and As.

The hydrogen absorbing material 130 may be commonly composed of an exothermic metal (generally represented by "A") and an endothermic metal (generally represented by "B"), wherein the exothermic metal (A) has strong affinity with hydrogen and can easily form a stable hydride with the hydrogen gas to thereby release heat during the reaction process; and on the other hand, the endothermic metal (B) has less affinity with hydrogen and needs to absorb heat during the reaction process. A composition ratio of the exothermic metal (A) and the endothermic metal (B) may be adjusted to obtain a hydrogen storage alloy with preferable property, which is capable of favorably absorbing the hydrogen gas and releasing the hydrogen gas under predetermined conditions.

Because the exothermic metal (A) can easily combine with hydrogen, theoretically, the composition ratio of the exothermic metal (A) is used to control "a hydrogen storage capacity". On the other hand, the endothermic metal (B) has less affinity with hydrogen, and thus the endothermic metal (B) is used to control "a reversibility for absorbing/releasing hydrogen".

Table 1 lists data published by United States Department of Energy with regard to type, material, hydrogen storage capacity, temperature and pressure of various hydrogen absorbing materials.

TABLE 1

| Type | Material | Hydrogen storage capacity (wt %) | Temperature (° C.) | Pressure (atm) |
|---|---|---|---|---|
| AB | TiCu | 1.7 | 200 | 0.004 |
| AB | $TiFe_{0.6}Ni_{0.4}$ | 1.5 | 50 | 0.035 |
| AB | CeNi | 1.8 | 20 | 0.05~0.01 |
| AB | $Li_{0.94}Pd$ | 0.9 | 300 | 0.02 |
| AB | ZrCo | 1.7 | 200 | 0.005 |
| AB2 | $CaNi_2$ | 2.1 | 25 | 0.05 |
| AB2 | $CeAl_{1.25}Cr_{0.75}$ | 0.6 | 25 | 0.05 |
| AB2 | CeMnAl | 0.9 | 25 | 0.05 |
| AB5 | $CaNi_4B$ | 1.2 | 27 | 0.01 |
| AB5 | $CaNi_5$ | 0.3 | 22 | 0.04 |
| AB5 | $LaNi_4Al$ | 1.1 | 20 | 0.001 |
| AB5 | $LaNi_4Cr$ | 0.54 | 25 | 0.04 |

Figure 2:
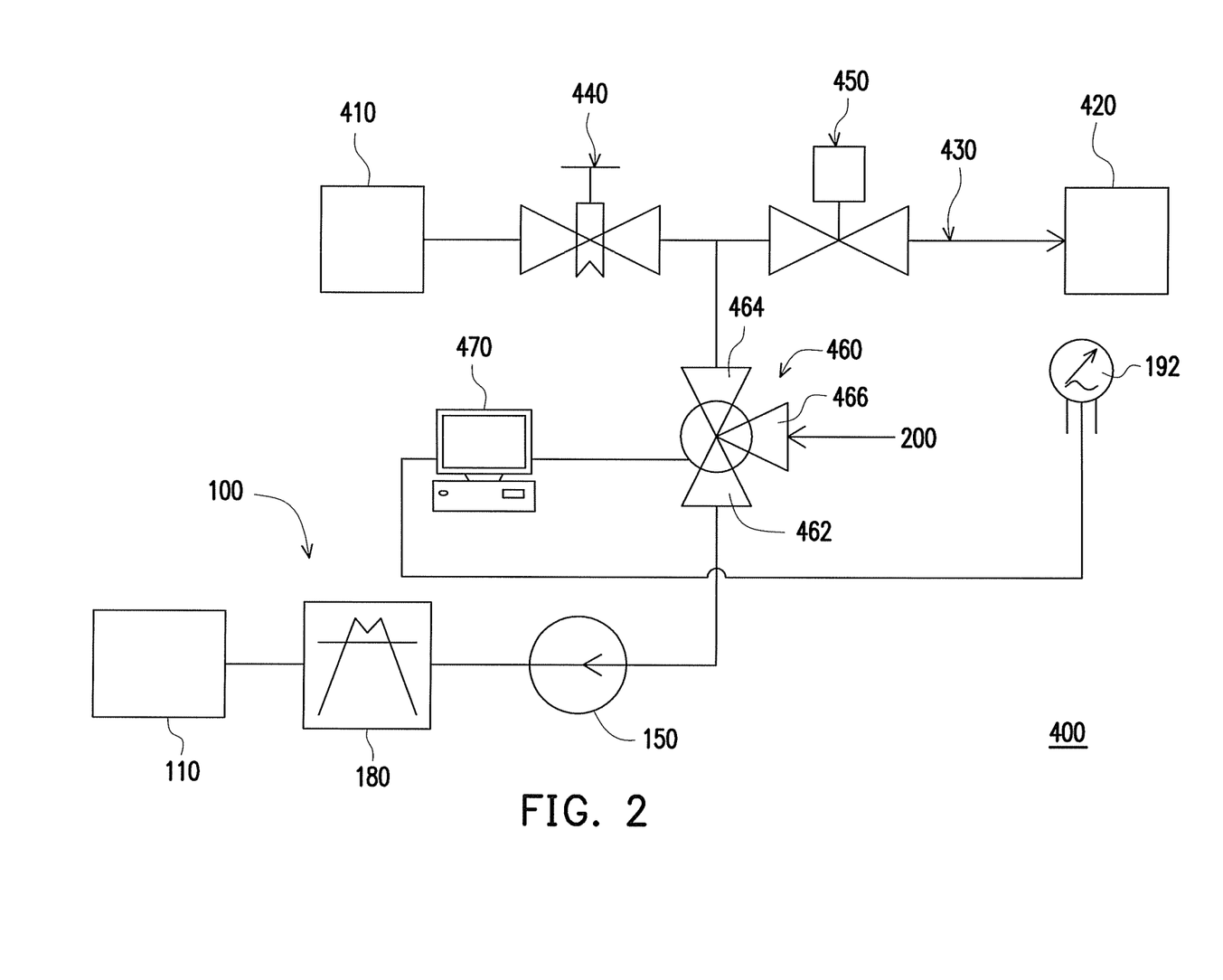
FIG. 2 is a schematic diagram of a hydrogen energy utilization system according to an embodiment of the present disclosure.

FIG. 2 is a schematic diagram of a hydrogen energy utilization system according to an embodiment of the present disclosure. Referring to FIG. 2, a hydrogen energy utilization system 400 is adapted to a closed environment with temperature of 10° C. to 60° C. The hydrogen energy utilization system 400 includes a hydrogen gas storage device 410, a hydrogen gas utilization device 420 and aforesaid leak hydrogen absorbing device 100. The hydrogen gas utilization device 420 connects to the hydrogen gas storage device 410 through a hydrogen gas transportation pipeline 430. Aforesaid leak hydrogen absorbing device 100 is connected to the position where the hydrogen-containing gas 200 is leaked in the closed environment.

The hydrogen energy utilization system 400 may be a combination of the hydrogen fuel cell and the leak hydrogen absorbing device 100 according to the embodiments of the present disclosure, and may be applied in the closed environment such as an apartment, a building, a motor car, a steamship, an excursion boat or an air independent propulsion (AIP) of a submarine.

Referring to FIG. 2, in an embodiment, the leak hydrogen absorbing device 100 and the hydrogen gas transportation pipeline 430 are connected in parallel to each other. In other words, when the hydrogen leakage occurs, the leak hydrogen absorbing device 100 not only absorbs the hydrogen gas leaked in the closed environment, but also absorb the hydrogen gas remained in the hydrogen gas transportation pipeline 430, so as to reduce the possibility of the hydrogen leakage to the outside.

As shown in FIG. 2, the hydrogen energy utilization system 400 further includes a manual valve 440 and a motor valve 450, which are disposed in sequence on the hydrogen gas transportation pipeline 430. An upstream of the manual valve 440 is connected to the hydrogen gas storage device 410, and a downstream of the motor valve 450 is connected to the hydrogen gas utilization device 420. With configuration of both the manual valve 440 and the motor valve 450, safety of the hydrogen transportation may be ensured. The manual valve 440 disposed at the upstream side can provide higher safety. When a hydrogen provider (i.e., the hydrogen gas storage device 410) requires emergency shut down due to the hydrogen leakage or a power shortage, the manual valve 440 may be manually turned off without being affected by the power shortage.

It should be noted that, the hydrogen energy utilization system 400 may also include a three-way valve 460, which has a first port 462, a second port 464 and a third port 466. The first port 462 is connected to the pump 150. The second port 464 is connected to a position between the manual valve 440 and the motor valve 450. The third port 466 is connected to the position where the hydrogen-containing gas 200 is leaked in the closed environment. The three-way valve 460 may be switched to connect the leak hydrogen absorbing device 100 to the hydrogen-containing gas 200 in the closed environment in order to absorb the hydrogen-containing gas 200 accumulated in the closed environment, or connect the leak hydrogen absorbing device 100 to the hydrogen gas transportation pipeline 430 in order to absorb the hydrogen gas remained in the hydrogen gas transportation pipeline 430.

The hydrogen energy utilization system 400 may also include a hydrogen gas detector 192, which is configured to detect the hydrogen-containing gas 200 leaked in the closed environment. The hydrogen gas detector 192 may be disposed near a position where the hydrogen-containing gas 200 is leaked in the closed environment. Similarly, when detecting that the hydrogen gas leakage occurs, the hydrogen gas detector 192 may feed back an activate signal to activate the pump 150, so as to start the operation of the leak hydrogen absorbing device 100; and when detecting that a hydrogen concentration in the closed environment is already returned back to a normal range, the hydrogen gas detector 192 may feed back a deactivate signal to deactivate the pump 150, so as to stop the operation of the leak hydrogen absorbing device 100. The hydrogen energy utilization system 400 may utilize a control unit 470 to operate the entire system.

Figure 3:
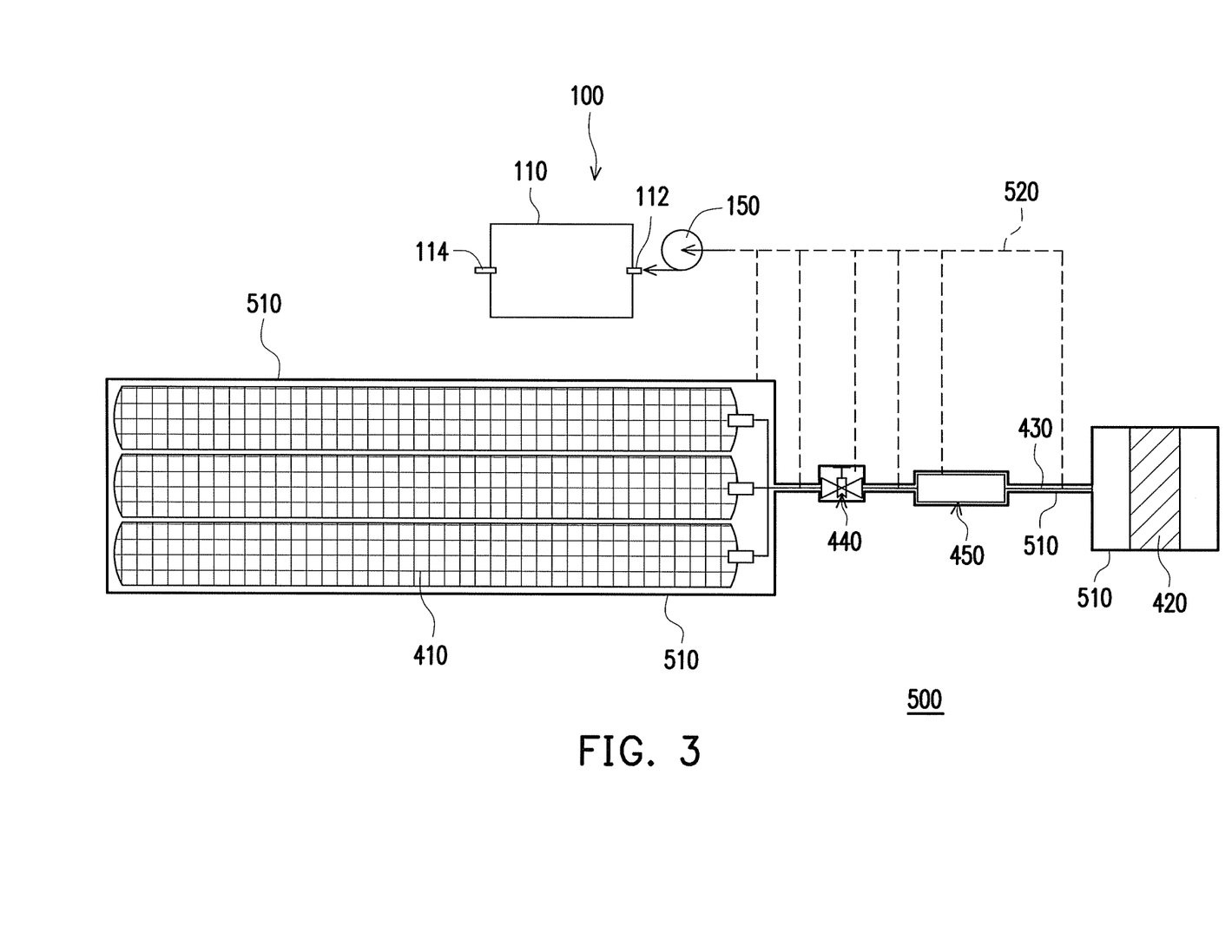
FIG. 3 is a schematic diagram of a hydrogen energy utilization system according to another embodiment of the present disclosure.

FIG. 3 is a schematic diagram of a hydrogen energy utilization system according to another embodiment of the present disclosure. Referring to FIG. 3, in the present embodiment, a hydrogen energy utilization system 500 may also include a containment 510, which surrounds the hydrogen gas storage device 410 and the hydrogen gas utilization device 420, and the leak hydrogen absorbing device 100 is connected on the containment 510.

In the present embodiment, the containment 510 is used to surround the position where the hydrogen gas leakage may occur, so that the leak hydrogen absorbing device 100 may be used to absorb the leaked hydrogen gas inside the containment 510. As such, safety of the hydrogen energy utilization system 500 may be further improved. Because the leaked hydrogen gas is contained inside the containment 510 and absorbed by the leak hydrogen absorbing device 100, a pipeline maintenance may be performed safely.

The leak hydrogen absorbing device 100 may be connected to the containment 510 through an exhaust pipeline 520; or the hydrogen gas transportation pipeline 430 and the leak hydrogen absorbing device 100 may be connected in parallel by using the exhaust pipeline 520, so as to absorb the hydrogen gas remained in the hydrogen gas transportation pipeline 430.

Although only one leak hydrogen absorbing device 100 is illustrated in the embodiments of FIG. 2 and FIG. 3, however, at least two of the leak hydrogen absorbing devices 100 may also be disposed for switching between the at least two leak hydrogen absorbing devices 100.

Specifically, when one of the leak hydrogen absorbing devices 100 is already saturated, another one of the leak hydrogen absorbing devices 100 may be switched to, so as to ensure that the leaked hydrogen gas may be absorbed. Meanwhile, the heater 170 (illustrated in FIG. 1) may be used to reduce the hydrogen absorbing material 130 in the leak hydrogen absorbing devices 100 with the absorption capability for hydrogen that is already saturated. As such, by alternately using the two leak hydrogen absorbing devices 100, the hydrogen energy utilization system (400, 500) is capable of performing steady operation for a long period of time while reducing the maintenance cost. Naturally, an amount of the leak hydrogen absorbing devices 100 being disposed may be selected according to actual conditions to be more than two.

According to yet another embodiment of the present disclosure, a leak hydrogen absorbing method is further proposed and includes the following steps. The process of the leak hydrogen absorbing method may be comprehended with reference to FIG. 1. First of all, the leak hydrogen absorbing device 100 according to foregoing embodiments is provided.

Subsequently, when detecting that the leaked hydrogen-containing gas 200 is present in the closed environment, the pump 150 is activated to start pumping the hydrogen-containing gas 200 to the absorbing tank 110.

Next, the hydrogen-containing gas 200 is passed to flow through the spaces S inside the absorbing tank 110, so that the hydrogen gas 200 contained in the hydrogen-containing gas is absorbed by the hydrogen absorbing material 130.

Thereafter, the hydrogen-free gas 300 passed through the hydrogen absorbing material 130 is stored, and the hydrogen-free gas 300 is discharged through the gas outlet 114 when the hydrogen-free gas 300 reaches a predetermined pressure. The predetermined pressure may be equal to or below 10 bar.

Figure 4:
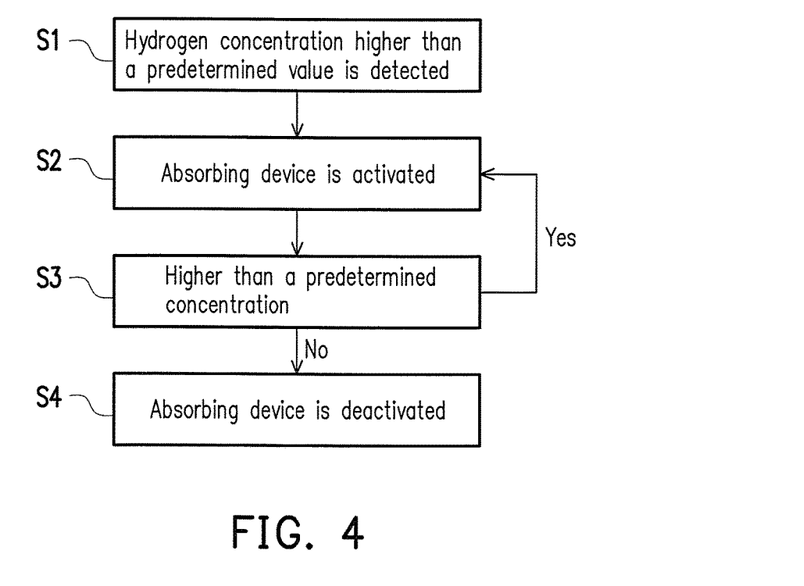
FIG. 4 is an illustration diagram of a leak hydrogen absorbing method according to an embodiment of the present disclosure.

FIG. 4 is an illustration diagram of a leak hydrogen absorbing method according to an embodiment of the present disclosure, in which steps S1 to S4 are used to activate or deactivate the leak hydrogen absorbing method 100. First, when a concentration of the leaked hydrogen gas higher than a predetermined value is detected as shown in step S1, proceeding to step S2, in which the leak hydrogen absorbing device 100 is activated. At this time, the concentration of the leaked hydrogen gas in the closed environment is constantly monitored, and when determining that the concentration is still higher than a predetermined concentration (step S3), returning back to step S2 so that the leak hydrogen absorbing device 100 remains in activated state. When determining that the concentration is lower than the predetermined concentration (step S3), proceeding to step S4, in which the leak hydrogen absorbing device 100 is deactivated.

Referring to FIG. 1, in an embodiment, the leak hydrogen absorbing method may further includes: passing the hydrogen-containing gas 200 through a filter 180 for filtering before entering the absorbing tank 110. The filter 180 can filter out harmful substances contained in the hydrogen-containing gas 200 to prevent the harmful substances from entering the absorbing tank 110 and causing degradation to the hydrogen absorbing material 130.

In an embodiment, the leak hydrogen absorbing method may also include a hydrogen absorbing material reduction step for heating the hydrogen absorbing material 130 to a predetermined temperature in order to release the absorbed hydrogen gas from the hydrogen absorbing material 130. As such, the hydrogen absorbing material 130 may regain the absorbing capability for the hydrogen gas. Also, the secondary use of the released hydrogen gas may be conducted. The above described "predetermined temperature" can be set to "a temperature that a hydrogen pressure released from the hydrogen absorbing material is larger than a pressure of the environment", then the hydrogen can be released smoothly. Besides, the "predetermined temperature" varies depending on kinds of hydrogen absorbing materials and the environmental pressures. Persons skilled in the art can modify the "predetermined temperature" as requirement.

Figure 5A:
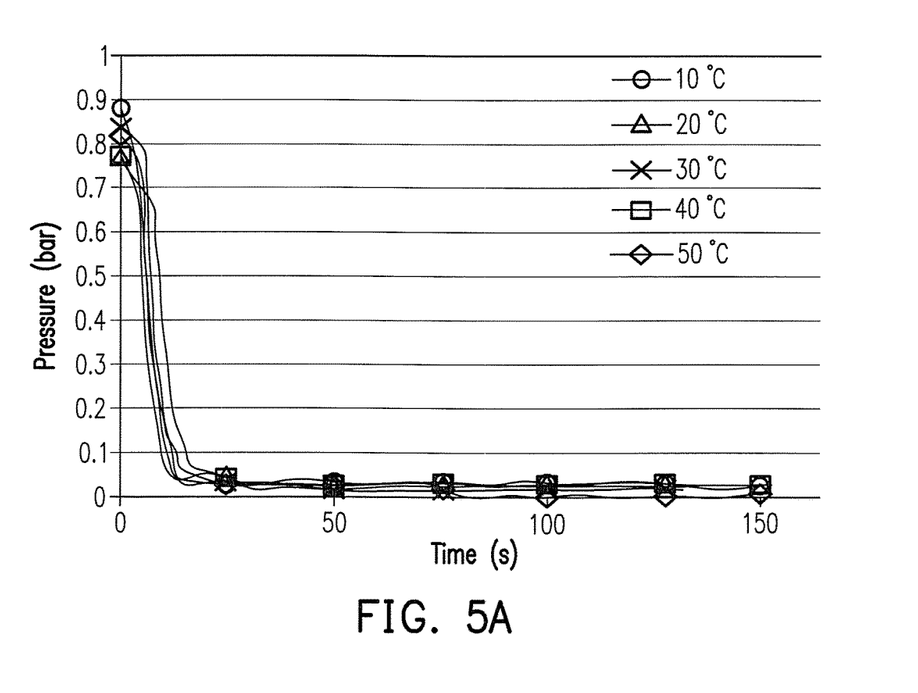
FIG. 5A is an illustration diagram of adsorption conditions for absorbing the hydrogen gas with the pressure of 1 bar by the hydrogen absorbing material in the closed environment, in which a vertical axis represents the pressure (bar) and a horizontal axis represents the time (second).
Figure 5B:
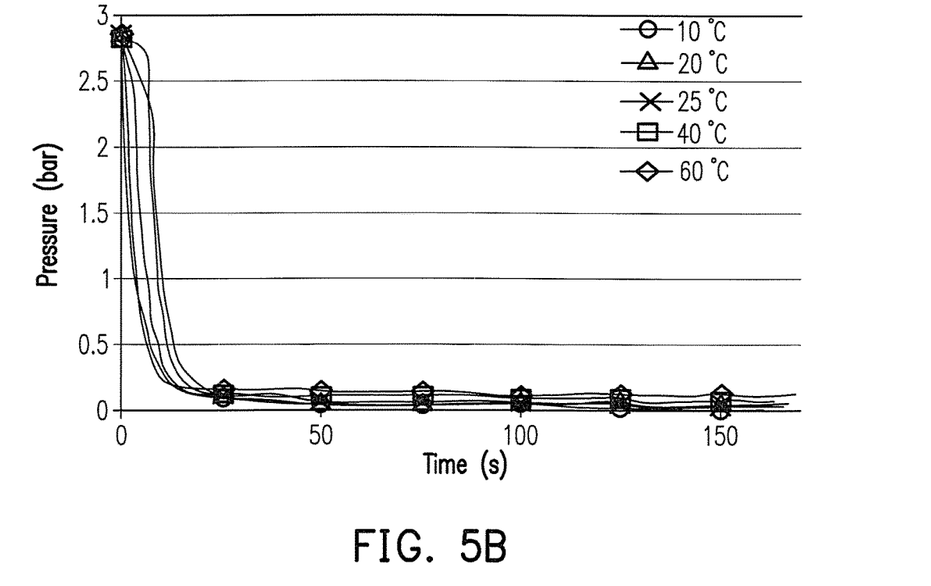
FIG. 5B is an illustration diagram of adsorption conditions for absorbing the hydrogen gas with the pressure of 3 bar by the hydrogen absorbing material in the closed environment, in which a vertical axis represents the pressure (bar) and a horizontal axis represents the time (second).

Hereinafter, experimental data is provided to validate that the leak hydrogen absorbing device 100 according to the embodiments of the present disclosure can indeed effectively absorb the leaked hydrogen gas. FIG. 5A is an illustration diagram of adsorption conditions for absorbing the hydrogen gas with the pressure of 1 bar by the hydrogen absorbing material in the closed environment, in which a vertical axis represents the pressure (bar) and a horizontal axis represents the time (second). FIG. 5B is an illustration diagram of adsorption conditions for absorbing the hydrogen gas with the pressure of 3 bar by the hydrogen absorbing material in the closed environment, in which a vertical axis represents the pressure (bar) and a horizontal axis represents the time (second). Referring to FIG. 5A and FIG. 5B, after approximately 15 seconds, the hydrogen gas with pressures of 1 bar and 3 bar in the closed environment may be absorbed, such that the pressures are close to zero.

Figure 6:
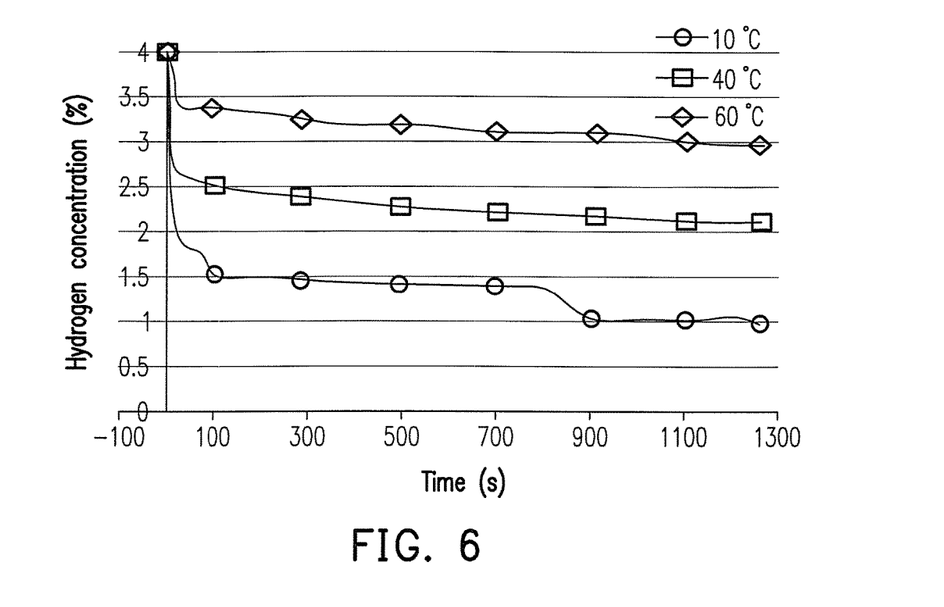
FIG. 6 is an illustration diagram of adsorption conditions for absorbing the hydrogen gas with the hydrogen concentration of 4% by the hydrogen absorbing material in the closed environment, in which a vertical axis represents the hydrogen concentration (%) and a horizontal axis represents the time (second).

FIG. 6 is an illustration diagram of adsorption conditions for absorbing the hydrogen gas with the hydrogen concentration of 4% by the hydrogen absorbing material in the closed environment, in which a vertical axis represents the hydrogen concentration (%) and a horizontal axis represents the time (second). Referring to FIG. 6, within tens of seconds, a concentration of the hydrogen gas can be lowered from 4% to below 4%. In view of FIG. 6, an efficiency for absorbing hydrogen is lower as temperature is higher (e.g., a curve of 60° C.); and the efficiency for absorbing hydrogen is higher as temperature is lower (e.g., a curve of 10° C.). In view of the above, the leak hydrogen absorbing device 100 according to embodiments of the present disclosure can effectively absorb the hydrogen gas in the closed environment under the predetermined conditions of proper temperature and pressure. The predetermined conditions of temperature and pressure can be designed by those skilled in the art and are not particularly limited herein.

In summary, the leak hydrogen absorbing device, the hydrogen energy utilization system and the leak hydrogen absorbing method of the present disclosure at includes the following advantages: capability of rapidly absorbing the hydrogen gas leaked in the closed environment, safe absorption and storage for the leaked hydrogen gas, and applications in narrow spaces without requiring the oxygen gas for burning the leaked hydrogen gas. By partitioning the interior of the absorbing tank into multiple spaces by using multiple spacers in the arrangement with interval from each other and placing the hydrogen absorbing material in each of the spaces, the hydrogen absorbing material may be uniformly placed into the absorbing tank 110 in order to provide the favorable adsorption for the hydrogen gas. The hydrogen energy utilization system according to the embodiments of the present disclosure may be applied in the fuel cell related industries, the green energy (the hydrogen energy) utilization related industries and transportation related industries, so as to facilitate improvements of safety of the hydrogen energy in the closed environment.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A leak hydrogen absorbing device for a closed environment, comprising:
   an absorbing tank, having a gas inlet and a gas outlet;
   a spacer, disposed inside the absorbing tank, and partitioning an interior of the absorbing tank into a plurality of spaces;
   a hydrogen absorbing material, disposed in the spaces;
   a connecting tube, disposed on the spacer, and connecting the spaces;
   a pump, pumping a hydrogen-containing gas leaked in the closed environment to the absorbing tank through the gas inlet to be flowed through the spaces inside the absorbing tank, so that a hydrogen gas contained in the hydrogen-containing gas is absorbed by the hydrogen absorbing material; and
   a depressurizing portion, disposed at a terminal end of the absorbing tank, storing a hydrogen-free gas passed through the hydrogen absorbing material, and discharging the hydrogen-free gas through the gas outlet when the hydrogen-free gas reaches a predetermined pressure.

2. The leak hydrogen absorbing device according to claim 1, wherein the spacer is plural, and
   the spacers are disposed inside the absorbing tank in an arrangement with interval from each other.

3. The leak hydrogen absorbing device according to claim 1, wherein the connecting tube is plural, and
   a predetermined distance is provided between positions of the connecting tubes respectively disposed on adjacent two of the spacers.

4. The leak hydrogen absorbing device according to claim 1, further comprising:
   at least one heater, disposed at one side of the absorbing tank, and
   the heater heating the hydrogen absorbing material in order to release the absorbed hydrogen gas from the hydrogen absorbing material.

5. The leak hydrogen absorbing device according to claim 1, further comprising:
   a filter, disposed in front of the gas inlet of the absorbing tank.

6. The leak hydrogen absorbing device according to claim 1, further comprising:
   a filter screen, disposed on at least one end of the communicating tube.

7. The leak hydrogen absorbing device according to claim 1, further comprising:
   a hydrogen gas detector, configured to detect the hydrogen-containing gas leaked in the closed environment.

8. The leak hydrogen absorbing device according to claim 1, wherein the hydrogen absorbing material is in form of powder, grain or ingot.

9. The leak hydrogen absorbing device according to claim 1, wherein the hydrogen absorbing material is selected from a combination of a first material and a second material, wherein
   the first material is selected from Ti, La, Mg, Sr, Li, Cr, Ir, Ca and Pd, and
   the second material is selected from Ag, Ni, Au, Pt, Cu, Co, Al, Fe, V, Mn and As.

10. A hydrogen energy utilization system for a closed environment, comprising:
    a hydrogen gas storage device;
    a hydrogen gas utilization device, connecting to the hydrogen gas storage device through a hydrogen gas transportation pipeline; and
    the leak hydrogen absorbing device according to claim 1, connected to a position where the hydrogen-containing gas is leaked in the closed environment.

11. The hydrogen energy utilization system according to claim 10, wherein the leak hydrogen absorbing device and the hydrogen gas transportation pipeline are connected in parallel to each other.

12. The hydrogen energy utilization system according to claim 10, further comprising:
    a manual valve and a motor valve, disposed in sequence on the hydrogen gas transportation pipeline,
    an upstream of the manual valve being connected to the hydrogen gas storage device, and
    a downstream of the motor valve being connected to the hydrogen gas utilization device.

13. The hydrogen energy utilization system according to claim 12, further comprising:
    a three-way valve, having a first port, a second port and a third port,
    the first port being connected to the pump,
    the second port being connected to a position between the manual valve and the manual valve, and
    the third port being connected to the position where the hydrogen-containing gas is leaked in the closed environment.

14. The hydrogen energy utilization system according to claim 10, further comprising:
    a hydrogen gas detector, configured to detect the hydrogen-containing gas leaked in the closed environment.

15. The hydrogen energy utilization system according to claim 10, further comprising:
    a containment, surrounding the hydrogen gas storage device and the hydrogen gas utilization device,
    the leak hydrogen absorbing device being connected on the containment.

16. The hydrogen energy utilization system according to claim 10, wherein at least two of the leak hydrogen absorbing devices are disposed so as to switch between the at least two leak hydrogen absorbing devices.

17. A leak hydrogen absorbing method, comprising:
    providing the leak hydrogen absorbing device according to claim 1;
    when detecting that the leaked hydrogen-containing gas is present in the closed environment, activating the pump to start pumping the hydrogen-containing gas to the absorbing tank;
    passing the hydrogen-containing gas to flow through the spaces inside the absorbing tank, so that the hydrogen gas contained in the hydrogen-containing gas is absorbed by the hydrogen absorbing material; and
    storing the hydrogen-free gas passed through the hydrogen absorbing material, and discharging the hydrogen-free gas through the gas outlet when the hydrogen-free gas reaches the predetermined pressure.

18. The leak hydrogen absorbing method according to claim 17, further comprising:
    passing the hydrogen-containing gas through a filter for filtering before entering the absorbing tank.

19. The leak hydrogen absorbing method according to claim 17, further comprising:

a hydrogen absorbing material reduction step, for heating the hydrogen absorbing material to a predetermined temperature in order to release the absorbed hydrogen gas from the hydrogen absorbing material.

20. The leak hydrogen absorbing method according to claim 17, wherein the predetermined pressure is equal to or below 10 bar.

* * * * *